(12) United States Patent
Imai

(10) Patent No.: US 9,678,881 B2
(45) Date of Patent: Jun. 13, 2017

(54) DATA DISTRIBUTION DEVICE AND DATA DISTRIBUTION METHOD

(71) Applicant: FUJITSU LIMITED, Kawasaki-shi, Kanagawa (JP)

(72) Inventor: Satoshi Imai, Kawasaki (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 0 days.

(21) Appl. No.: 14/548,451

(22) Filed: Nov. 20, 2014

(65) Prior Publication Data

US 2015/0149726 A1 May 28, 2015

(30) Foreign Application Priority Data

Nov. 28, 2013 (JP) ................................ 2013-246599

(51) Int. Cl.
| | | |
|---|---|---|
| *G06F 12/08* | (2016.01) | |
| *G06F 12/12* | (2016.01) | |
| *H04L 29/08* | (2006.01) | |
| *G06F 12/0875* | (2016.01) | |
| *G06F 12/122* | (2016.01) | |

(52) U.S. Cl.
CPC ...... *G06F 12/0875* (2013.01); *H04L 67/2842* (2013.01); *G06F 12/122* (2013.01); *G06F 2212/464* (2013.01); *Y02B 60/1225* (2013.01)

(58) Field of Classification Search
CPC .............. G06F 12/0875; G06F 12/122; G06F 2212/464; H04L 67/2842
See application file for complete search history.

(56) References Cited

U.S. PATENT DOCUMENTS

| | | | | |
|---|---|---|---|---|
| 5,333,272 A | * | 7/1994 | Capek ................... | G06F 11/327 |
| | | | | 714/E11.003 |
| 2006/0075082 A1 | * | 4/2006 | Haga ....................... | H04L 67/06 |
| | | | | 709/223 |

(Continued)

FOREIGN PATENT DOCUMENTS

| | | |
|---|---|---|
| JP | 2004-295845 | 10/2004 |
| JP | 2005-157605 | 6/2005 |
| JP | 2013-183241 | 9/2013 |

OTHER PUBLICATIONS

Imai et al., "Energy Efficient Content Locations for In-Network Caching", *Asia-Pacific Conference on Communications*, 2012, 6 pp.

(Continued)

*Primary Examiner* — Aracelis Ruiz
(74) *Attorney, Agent, or Firm* — Staas & Halsey LLP

(57) ABSTRACT

A data distribution device includes: a memory configured to store cache data of data to be distributed; and a processor coupled to the memory and configured to: read the cache data from the memory in accordance with a request message received from other devices to distribute the cache data to the other devices, update, when the request message is received, a counter value that gets closer to a given value with time, so as to make the counter value move away from the given value in accordance with a reference value that is a reciprocal of a threshold value of a reception rate of the request message, whether or not to store the cache data being determined based on the reception rate; and discard the cache data in the memory when the counter value becomes the given value.

10 Claims, 14 Drawing Sheets

(56) References Cited

U.S. PATENT DOCUMENTS

2008/0027897 A1*  1/2008  Ushiyama ......... G06F 17/30215
2011/0238927 A1*  9/2011  Hatano ................ G06F 12/122
                                                        711/145
2013/0227168 A1   8/2013  Imai

OTHER PUBLICATIONS

Imai et al., "Energy-Aware Cache Management for Content-Centric Networking", *2013 27th International Conference on Advanced Information Networking and Applications Workshops*, Mar. 2013, pp. 1623-1629.

* cited by examiner

DATA DISTRIBUTION DEVICE AND DATA DISTRIBUTION METHOD

CROSS-REFERENCE TO RELATED APPLICATION

This application is based upon and claims the benefit of priority of the prior Japanese Patent Application No. 2013-246599, filed on Nov. 28, 2013, the entire contents of which are incorporated herein by reference.

FIELD

The embodiments discussed herein are related to data distribution devices and data distribution methods.

BACKGROUND

With the advancement of a public communications network such as the Internet, the traffic volume between terminal devices such as computers and smartphones and server devices that distribute data such as digital contents to the terminal devices is increased. The digital contents include, for example, websites, video data, music data, and software.

Since the electric power consumption of networking equipment such as routers and server devices is increased with an increase in traffic volume, a reduction in the volume of traffic flowing through the network is desired. In response to this, a technique of reducing the traffic volume by holding cache data (replica) of digital content in a plurality of routers and distributing the cache data from a router of a node close to a terminal device has been known (see Japanese Laid-open Patent Publication No. 2013-183241 and Satoshi Imai et al., "Energy Efficient Content Locations for In-Network Caching", In Proc. of Asia-Pacific Conference on Communications, Jeju, Korea, 2012). On the other hand, since the use of a storage is expected to be increased in the future due to holding of the cache data, the realization of cache data placement determined with consideration given to the relationship between a reduction in traffic and the holding amount of the storage becomes important.

Such a technique is called "content centric networking (CCN)" or the like, and a cache node used in CCN is called a "content router (CR)" or the like. For example, in CCN, an operational method such as deriving appropriate placement of cache data in the network in order to reduce consumed power with consideration given to the consumed power caused by caching digital content in memory, the cost of memory, the consumed power caused by distribution of digital content has been studied. In so doing, information such as a list of all the contents in the network and the distribution of requests for the content is also used.

Moreover, in Satoshi Imai et al., "Energy-Aware Cache Management for Content-Centric Networking", in Proc. of First International Workshop on Energy-Aware Systems, Communications and Security, Barcelona, Spain, March 2013, a technique of controlling the efficient cache data placement by performing autonomous distribution processing in each node to facilitate the management of content information in the whole network in the CCN technology is disclosed. In this autonomous distribution processing, an appropriate threshold value of a request rate used to determine whether or not to perform caching is derived in order to reduce consumed power with consideration given to the consumed power caused by caching digital content and the consumed power caused by distribution of digital content.

SUMMARY

According to an aspect of the invention, a data distribution device includes: a memory configured to store cache data of data to be distributed; and a processor coupled to the memory and configured to: read the cache data from the memory in accordance with a request message received from other devices to distribute the cache data to the other devices, update, when the request message is received, a counter value that gets closer to a given value with time, so as to make the counter value move away from the given value in accordance with a reference value that is a reciprocal of a threshold value of a reception rate of the request message, whether or not to store the cache data being determined based on the reception rate; and discard the cache data in the memory when the counter value becomes the given value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings.

While inventing the present embodiments, observations were made regarding a related art. Such observations include the following, for example.

In the related art, as described earlier, in implementing efficient cache control with consideration given not only to the amount of consumed power, but also to the relationship between the storage cost associated with cache of content and the traffic transmission cost associated with distribution of content, a mechanism of cache determination using a threshold value for a request rate is useful.

The request rate represents the number of requests for digital content in a unit time (for example, 1 (second)). The cache data of each node is held if the measured request rate exceeds a threshold value and is discarded if the request rate falls below the threshold value. In this manner, the cache data of digital content is managed.

However, since request rate measurement processing is performed in real time for each digital content in each node, the following problem arises: the more contents, the heavier the load of the processing. Therefore, a simple cache data management method is desired. Incidentally, such a problem may arise not only in the method disclosed in Satoshi Imai et al., "Energy-Aware Cache Management for Content-Centric Networking", in Proc. of First International Workshop on Energy-Aware Systems, Communications and Security, Barcelona, Spain, March 2013, but also in other methods for determining whether or not to perform caching based on a threshold value.

Accordingly, the embodiments may solve the above-described problem and may provide a data distribution device and a data distribution method that are capable of managing cache data with ease.

Figure 1:
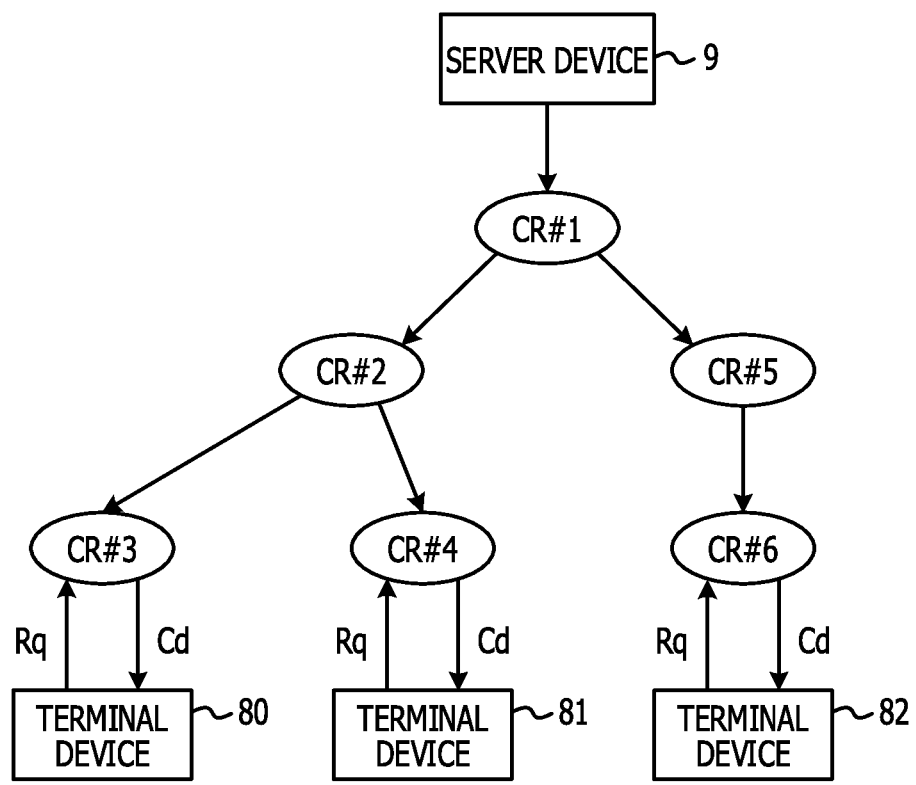
FIG. 1 is a configuration diagram depicting an example of a content distribution system.

FIG. 1 is a configuration diagram depicting an example of a content distribution system. In the embodiments, as data to be distributed, digital contents such as websites, video data, music data, and software are taken up as examples. However, the data to be distributed is not limited thereto, and an object to be distributed may be other types of data.

The content distribution system includes a plurality of terminal devices 80 to 82, a server device 9, and a plurality of content routers CR#1 to #6. The server device 9 holds digital contents and supplies the digital contents to the plurality of content routers CR#1 to #6.

The content routers CR#1 to #6 are routers having the function of, in addition to performing channel control of packets, acquiring digital content from the server device 9 and caching the digital content. The content routers CR#1 to #6 are capable of holding cache data of multiple types of digital contents. Incidentally, as a network in which the content routers CR#1 to #6 are provided, there are an access network, a metro network, a core network, and so forth, but the network is not limited to these networks.

The content routers CR#1 to #6 are connected to one another in such a way as to form a tree structure. In the embodiments, the content router CR#1 is located at the top of the tree structure and is connected to the server device 9 and the content routers CR#2 and CR#5 in a lower layer. The content router CR#2 is connected to the content routers CR#3 and CR#4 in the lowest layer, and the content router CR#5 is connected to the content router CR#6 in the lowest layer.

The terminal devices 80 to 82 are communication devices such as computers and smartphones and transmit, to the server device 9, a request message Rq that requests distribution of digital content. The request message Rq contains identification information indicating the terminal devices 80 to 82 which are requestors, type information indicating the type of digital content to be requested, and so forth.

If the content routers CR#1 to #6 hold cache data Cd of the digital content when receiving a request message, the content routers CR#1 to #6 distribute the cache data Cd to the terminal devices 80 to 82. On the other hand, if the content routers CR#1 to #6 do not hold the cache data Cd of the digital content, the content routers CR#1 to #6 transfer the request message Rq to the content routers CR#1 to #6 in the upper layer.

This makes it possible for the terminal devices 80 to 82 to receive the cache data Cd from a content router of the content routers CR#1 to #6, the content router closest thereto, that is, the content router with the smallest number of hops. For example, the terminal device 80 is capable of receiving the cache data Cd from the content router CR#3, and, if the content router CR#3 does not hold the cache data Cd, the terminal device 80 is capable of receiving the cache data Cd from the content router CR#2. Therefore, since the volume of traffic flowing through the network is reduced, the electric power consumption of networking equipment is also reduced.

By autonomous distribution processing, the content routers CR#1 to #6 individually derive a threshold value $\lambda t$ of a request rate based on which whether or not to cache digital content is determined. The threshold value $\lambda t$ is derived as an appropriate value for minimizing consumed power with consideration given to, for example, the consumed power caused by caching digital content and the consumed power caused by distribution of digital content. Here, the request rate represents the number of request messages Rq for digital content in a unit time (for example, 1 (second)). In other words, the request rate represents the number of request messages Rq which the content routers CR#1 to #6 receive in a unit time, that is, the reception rate.

Figure 2:
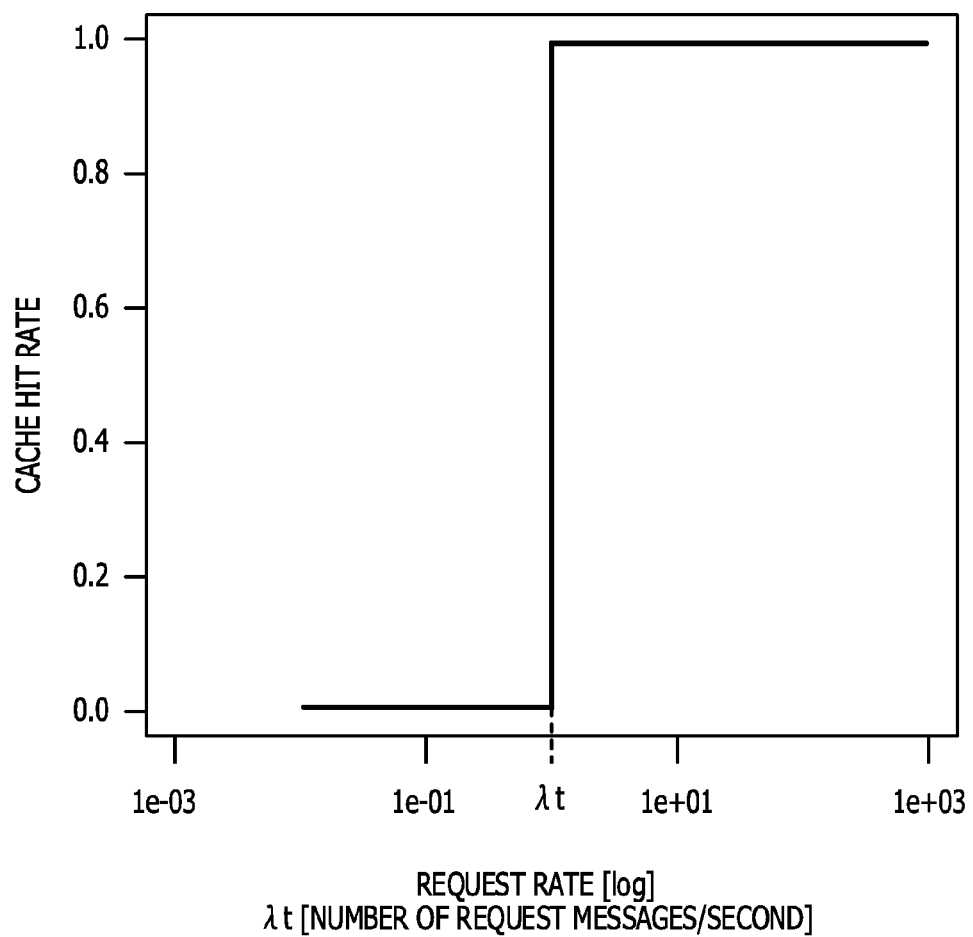
FIG. 2 is a graph depicting ideal characteristics of a cache hit rate for a request rate.

FIG. 2 is a graph depicting ideal characteristics of a cache hit rate for a request rate. In FIG. 2, as an example, the horizontal axis represents the request rate $\lambda c$ (the number of request messages/second) of digital content "c" and the vertical axis represents the cache hit rate of cache data of the digital content "c". The cache hit rate is the probability that the cache data Cd of the digital content is held when a request message is received. For example, if the cache hit rate is 0.5, the cache data Cd is held with a probability of one in every two reception operations.

As ideal characteristics, the content routers CR#1 to #6 hold the cache data Cd if the request rate $\lambda c$ exceeds the threshold value $\lambda t$ and do not hold the cache data Cd if the request rate $\lambda c$ falls below the threshold value $\lambda t$. That is, the cache hit rate is divided into 1 and 0 across the threshold value $\lambda t$. As a result, the higher the frequency of access to digital content from the terminal devices 80 to 82 (the more popular the digital content), the higher the probability of being cached.

It is possible to realize such ideal characteristics by measuring the request rate for digital content in each of the content routers CR#1 to #6. However, in this case, since the request rate measurement processing is performed in real time for each digital content, the load of the processing is increased depending on the number of digital contents.

Thus, a data distribution device according to the embodiments realizes the above-described ideal characteristics by low-load processing using a counter value without measuring a request rate as will be described below. Incidentally, the content routers CR#1 to #6 are taken up as the data distribution device according to the embodiments, but the data distribution device is not limited thereto and may be other networking equipment.

Figure 3:
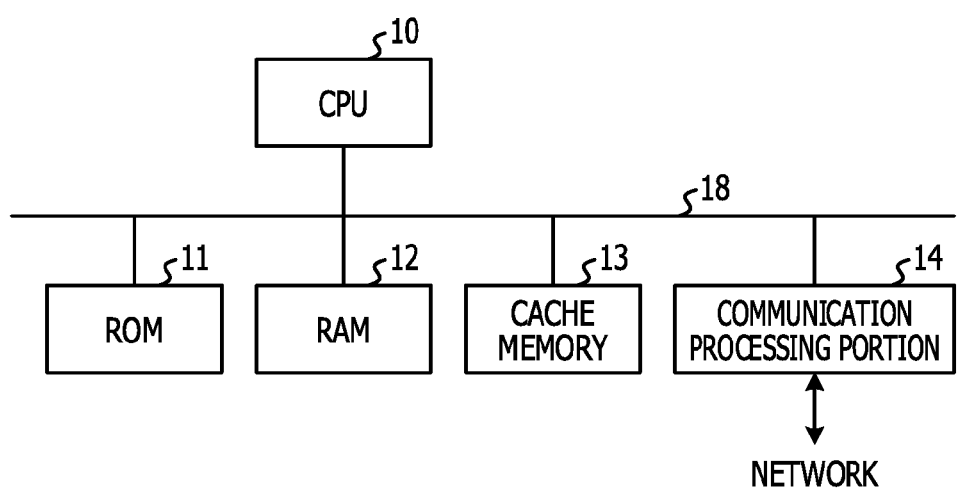
FIG. 3 is a configuration diagram depicting a data distribution device according to an embodiment.

FIG. 3 is a configuration diagram depicting the data distribution device according to the embodiments. The data distribution device includes a CPU 10, read-only memory (ROM) 11, random-access memory (RAM) 12, cache memory (a storing portion) 13, a communication processing portion 14, and so forth.

The CPU 10 is an arithmetic processing unit and performs channel control of packets and a data distribution method, which will be described later, in accordance with a program. The CPU 10 is connected to the portions 11 to 13 via a bus 18 in such a way that communication with the portions 11 to 13 is possible. Incidentally, the data distribution device is not limited to a device that operates by software, and hardware such as an application-specific integrated circuit may be used in place of the CPU 10.

The ROM 11 is used as a storing unit that stores a program or the like that makes the CPU 10 operate. The program is updated via a network, for example. The RAM 12 is used as a working memory of the CPU 10. The cache memory 13 is used to cache digital content and stores one or more pieces of cache data Cd. Incidentally, the storing unit that stores the cache data Cd is not limited to the cache memory 13; for example, other storing units such as a hard disk drive may be used.

The communication processing portion 14 is a local area network (LAN) port and is connected to the network. The communication processing portion 14 performs packet transmission and reception processing. The communication processing portion 14 performs, for example, processing to receive the request message Rq transmitted by the terminal devices 80 to 82, processing to transmit the cache data Cd to the terminal devices 80 to 82, processing to transfer the request message Rq to other content routers CR#1 to #6, and so forth.

Figure 4:
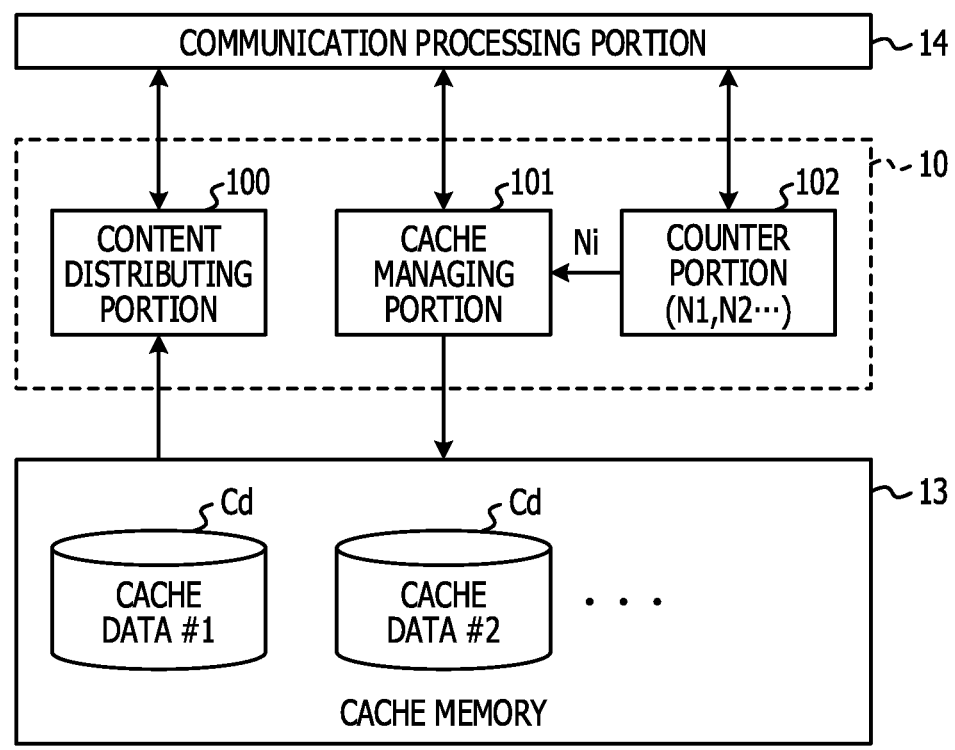
FIG. 4 is a configuration diagram depicting the functional configuration of the data distribution device.

When the program is executed, a plurality of functions are formed in the CPU 10. FIG. 4 is a configuration diagram depicting the functional configuration of the data distribution device. In FIG. 4, of the functions formed in the CPU 10, the function related to the distribution and caching of content, the communication processing portion 14, and a plurality of pieces of cache data (#1, #2, . . . ) Cd stored in the cache memory 13 are depicted.

The CPU 10 has a content distributing portion (a distributing portion) 100, a cache managing portion (a managing portion) 101, and a counter portion 102. The cache managing portion 101 receives digital content which is distributed from the server device 9 or other content routers CR#1 to #6 via the communication processing portion 14 and caches the digital content in the cache memory 13. As a result, the cache memory 13 stores corresponding cache data (#1, #2, . . . ) Cd for each digital content.

The content distributing portion 100 reads the cache data (#1, #2, . . . ) Cd of the digital content corresponding to the request message Rq from the cache memory 13 in accordance with the request message Rq received from the terminal devices 80 to 82 via the communication processing portion 14. Then, the content distributing portion 100 distributes the read cache data (#1, #2, . . . ) Cd to the terminal devices 80 to 82. The content distributing portion 100 is capable of distributing the cache data (#1, #2, . . . ) Cd to the plurality of terminal devices 80 to 82 at one time via the communication processing portion 14.

As described above, since the content distributing portion 100 distributes the cache data Cd to the terminal devices 80 to 82 in accordance with the request message Rq, the terminal devices 80 to 82 are capable of receiving the digital content without accessing the server device 9 which is a supply source of digital contents to be distributed. As a result, the traffic volume of the network is reduced.

Moreover, the cache managing portion 101 manages the cache data (#1, #2, . . . ) Cd based on counter values N1, N2, . . . (Ni) acquired from the counter portion 102. The counter values N1, N2, . . . are provided one for each of the digital contents, that is, each of the cache data (#1, #2, . . . ) Cd. For example, the counter value N1 is used for management of the cache data (#1) Cd, and the counter value N2 is used for management of the cache data (#2) Cd. Incidentally, in the following description, the counter values N1, N2, . . . are written as "Ni" (i=1, 2, . . . ) as a representative thereof.

The cache managing portion 101 discards the cache data (#1, #2, . . . ) Cd when the counter value Ni becomes a given value K (for example, 0). At this time, the cache managing portion 101 deletes, for example, the cache data (#1, #2, . . . ) Cd from the cache memory 13. When receiving the request message Rq after the cache data (#1, #2, . . . ) Cd is discarded, the cache managing portion 101 acquires the digital content from the server device 9 in the network and caches the digital content in the cache memory 13. As a result, since the cache data Cd is stored in the cache memory 13 again, the data distribution device is capable of distributing the cache data Cd again.

The counter portion 102 controls the counter value Ni. The counter portion 102 brings the counter value Ni closer to the given value K by decreasing the counter value Ni with time. For example, the counter value Ni is decreased only by 1 in a unit time (for example, 1 (second)). Incidentally, the decrease ratio of the counter value Ni is not limited to 1 and may be determined by a given decrease rate α as will be described later.

Moreover, the counter portion 102 sets the reciprocal (1/λt) of the threshold value λt of the above-described request rate λc as a reference value TTLt, and, when the request message Rq is received, the counter portion 102 updates the counter value Ni in such a way as to make the counter value Ni move away from the given value K in accordance with the reference value TTLt. More specifically, the counter portion 102 increases the counter value Ni and sets the counter value Ni at a value greater than or equal to the given value K, for example.

For example, the counter portion 102 brings the counter value Ni back to the reference value TTLt when the communication processing portion 14 receives the request message Rq. In this case, the counter portion 102 sets the range of the counter value Ni at a range of the given value K to the reference value TTLt. Incidentally, the counter portion 102 is not limited thereto, and, as will be described later, the counter portion 102 may add the product (α·TTLt) of the reference value TTLt and the decrease rate α to the counter value Ni when the communication processing portion 14 receives the request message Rq.

Next, an example of operation of the data distribution device will be described.

First Embodiment

Figure 5:
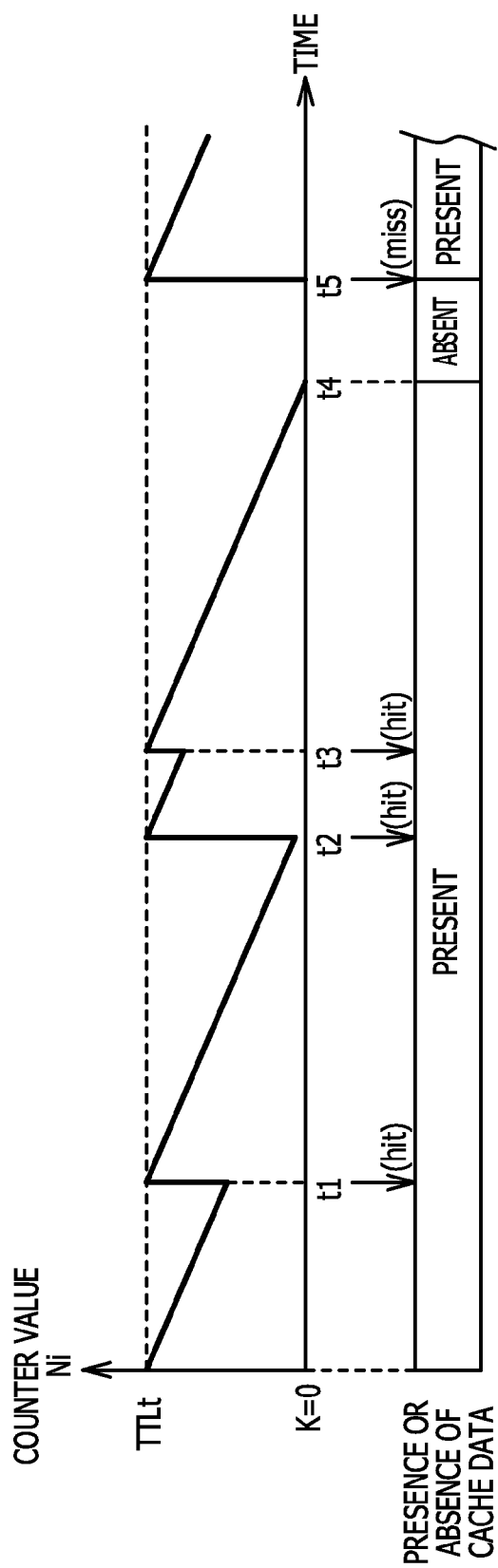
FIG. 5 is a graph depicting an example of changes in a counter value in a first embodiment.

FIG. 5 is a graph depicting an example of changes in the counter value Ni in a first embodiment. In FIG. 5, the horizontal axis represents the time and the vertical axis represents the counter value Ni. Here, times t1 to t3 and t5 indicate the time of receipt of the request message Rq, and time t4 indicates the time at which the counter value Ni has become the given value K=0.

Moreover, FIG. 5 depicts the presence or absence of the cache data Cd (see "PRESENT" and "ABSENT") in accordance with time, that is, whether or not the cache data Cd is stored in the cache memory 13. Furthermore, "(HIT)" and "(MISS)" written corresponding to times t1 to t3 and t4 of receipt of the request message Rq indicate the presence and the absence, respectively, of a hit of the cache data Cd.

In this embodiment, the counter portion 102 sets the range of the counter value Ni at a range of the given value (the lower limit) K=0 to the reference value TTLt ($=1/\lambda t$), and, when the request message Rq is received, brings the counter value Ni that decreases with time back to the reference value TTLt. As a result, the counter value Ni becomes the reference value TTLt at times t1 to t3 and t5 of receipt of the request message Rq and continues decreasing in other periods of time. The decrement of the counter value Ni in a unit time (for example, 1 (second)) is 1, for example, but is not limited thereto.

Since the counter value Ni is brought back to the reference value TTLt by the receipt of the request message Rq at times t1 to t3, the counter value Ni does not reach 0 (the given value K) until time t4. As a result, the cache data Cd is stored in the cache memory 13 at times t1 to t3, and a hit of the cache data Cd occurs.

The counter value Ni reaches 0 (the given value K) at time t4 and is maintained at 0 until time t5 at which a new request message Rq is received. When detecting that the counter value Ni has become 0, the cache managing portion 101 discards the cache data Cd. As a result, the cache data Cd is not stored in the cache memory 13 between time t4 and time t5.

Therefore, at time t5 of receipt of the request message Rq, a hit of the cache data Cd does not occur. That is, at time t5, a cache error of the cache data Cd occurs. At this time, the cache managing portion 101 transfers the request message Rq to the other content routers CR#1 to #6 (data distribution devices).

Moreover, at time t5 of receipt of the request message Rq, the cache managing portion 101 acquires digital content from the server device 9 and caches the digital content in the cache memory 13. As a result, after time t5, the cache data Cd is stored in the cache memory 13.

As described above, the counter value Ni gets closer to 0 (the given value K) with time if the request message Rq is not received and moves away from 0 by being brought back to the reference value TTLt when the request message Rq is received. The cache data Cd is discarded when the counter value Ni becomes 0. Therefore, the higher the request rate $\lambda c$ of digital content, that is, the higher the frequency of access to the digital content, the higher the probability (the probability of cache hits) of being cached.

Figure 6:
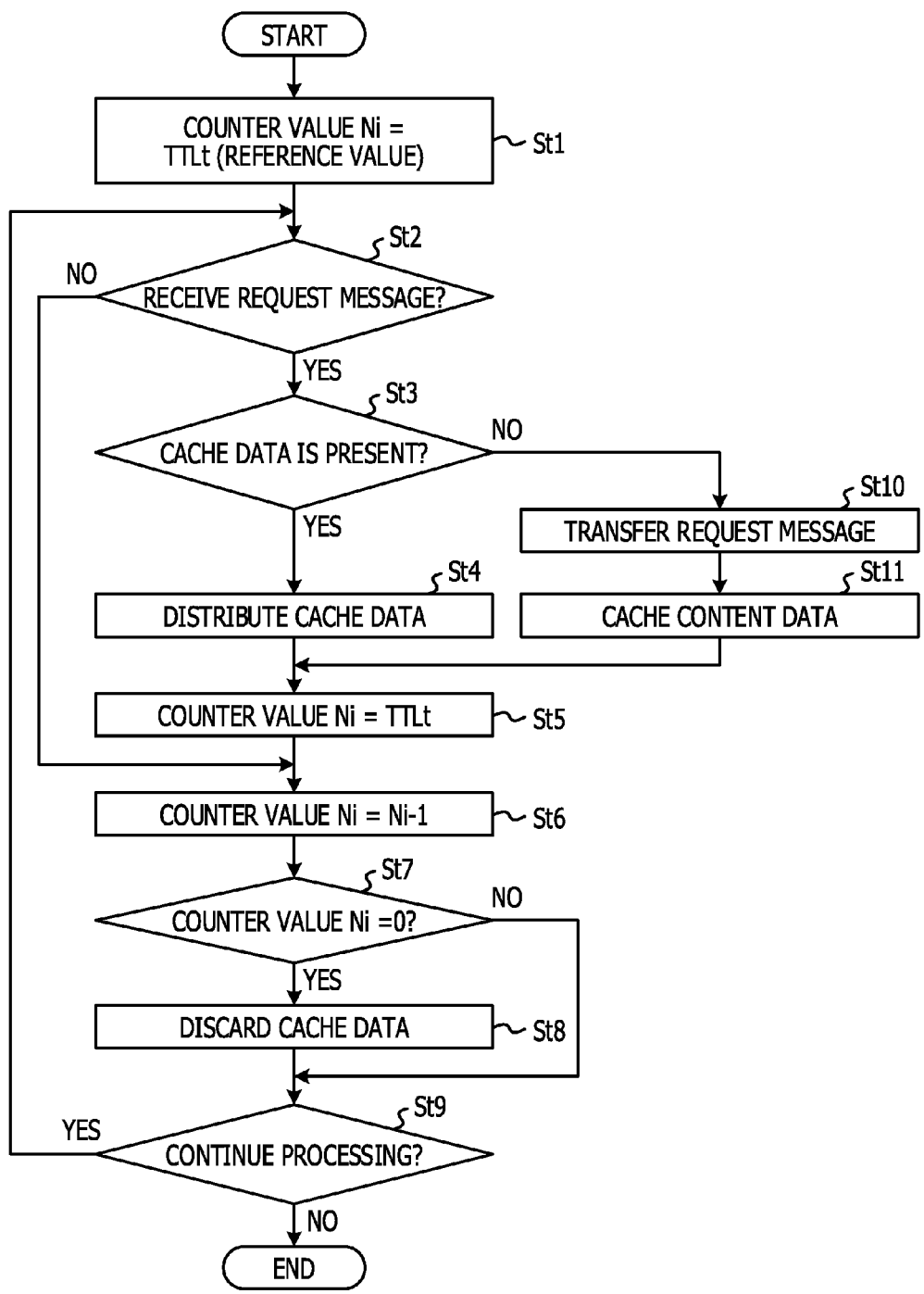
FIG. 6 is a flowchart depicting processing of the data distribution device according to the first embodiment.

FIG. 6 is a flowchart depicting processing (a data distribution method) of the data distribution device according to the first embodiment. FIG. 6 depicts processing related to management of cache data Cd of one piece of digital content, and this processing is performed in a similar manner on cache data Cd of each digital content.

First, the counter portion 102 sets the counter value Ni at the reference value TTLt (step St1). Next, the content distributing portion 100 determines whether or not the communication processing portion 14 has received the request message Rq (step St2).

If the request message Rq has been received (Yes in step St2), the content distributing portion 100 determines the presence or absence of cache data Cd of digital content corresponding to the request message Rq (step St3). At this time, the content distributing portion 100 detects whether or not the cache data Cd of the digital content is stored in the cache memory 13 based on the type information of digital content contained in the request message Rq. Moreover, if the request message Rq has not been received (No in step St2), processing in step St6 which will be described below is performed.

If the cache data Cd is present (Yes in step St3), the content distributing portion 100 distributes the cache data Cd to the terminal devices 80 to 82 via the communication processing portion 14 (step St4). Moreover, if the cache data Cd is absent (No in step St3), the content distributing portion 100 transfers the request message Rq to the other content routers CR#1 to #6 via the communication processing portion 14 (step St10). Next, the content distributing portion 100 acquires digital content distributed from the server device 9 or the other content routers CR#1 to #6 and caches the digital content in the cache memory 13 (step St11). As a result, the cache data Cd is stored in the cache memory 13. Incidentally, processing in step St10 may be performed before or after processing in step St11 and vice versa.

After the processing in step St4 or steps St10 and St11, the counter portion 102 brings the counter value Ni back to the reference value TTLt (step St5). Next, the counter portion 102 subtracts 1 from the counter value Ni (step St6). The processing in step St6 is performed at fixed time intervals based on a timing signal (a clock signal) which is input to the CPU 10, for example, such that a fixed decrement is obtained in each unit time of the counter value Ni.

Next, the cache managing portion 101 acquires the counter value Ni from the counter portion 102 and detects whether or not the counter value Ni is 0 (the given value K) (step St7). If the counter value Ni is not 0 (No in step St7), processing in step St9 which will be described below is performed.

If the counter value Ni is 0 (Yes in step St7), the cache managing portion 101 discards the cache data Cd (step St8). Then, if the CPU 10 continues the processing (Yes in step St9), the CPU 10 performs the processing in step St2 again; if the CPU 10 does not continue the processing (No in step St9) due to, for example, the shutdown of the data distribution device, the CPU 10 ends the processing. In this manner, the processing of the data distribution device is performed.

Figure 7:
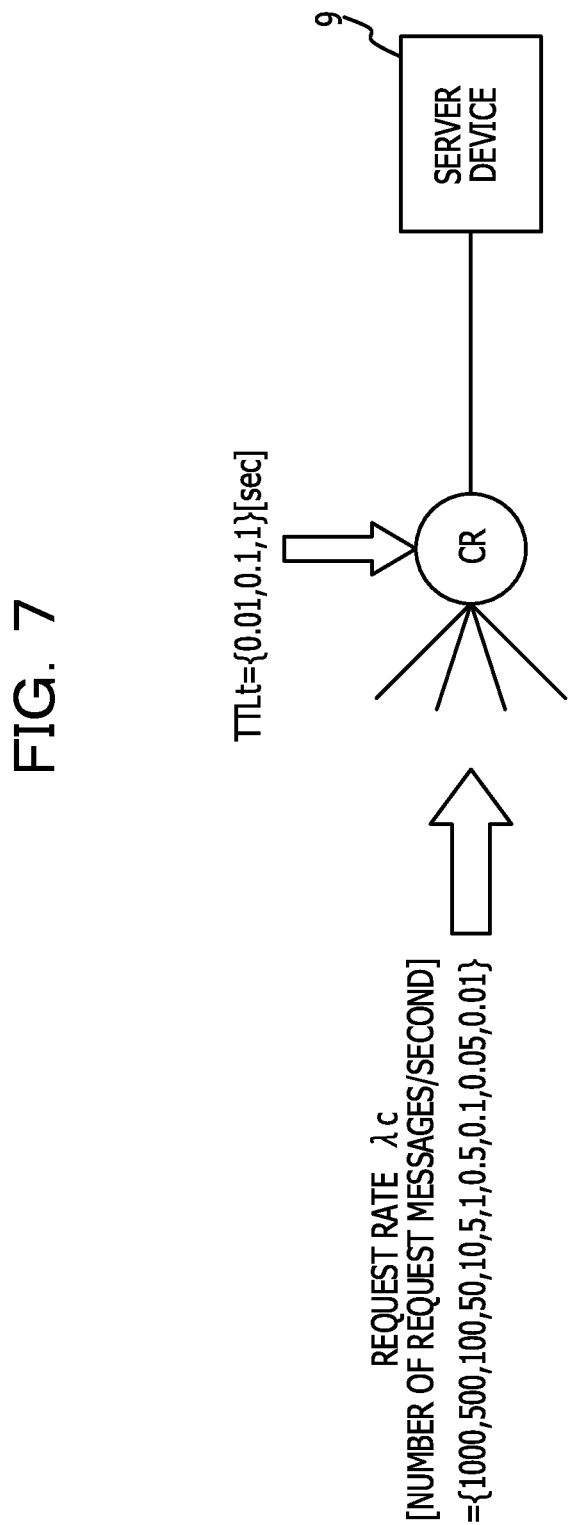
FIG. 7 is a diagram depicting the condition of numerical simulation for verifying the effect.

Next, the effect of the first embodiment will be described. In FIG. 7, the condition of numerical simulation for verifying the effect is depicted. By performing the processing described above, the content router (the data distribution device) CR caches the digital content acquired from the server device 9 or discards the cache data Cd.

In the numerical simulation, the cache hit rate of content with 11 types of value extracted from a range of 0.01 to 1000 as the request rate $\lambda c$ of the request message Rq is calculated. Moreover, the numerical simulation is performed on three types of reference value TTLt ($=0.01, 0.1, 1$).

Figure 8A:
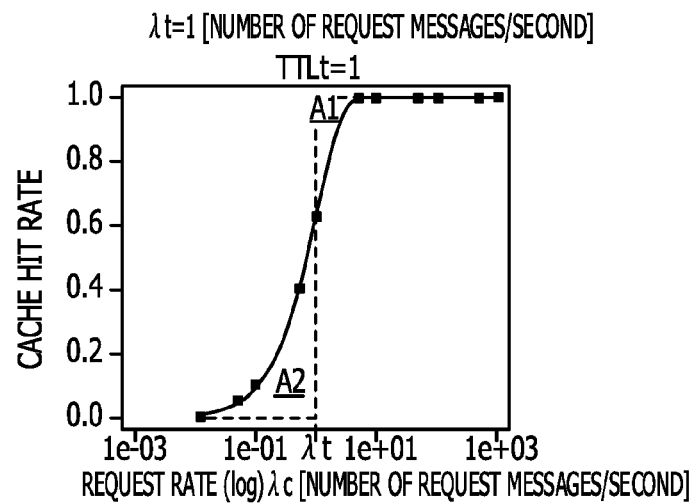
FIGS. 8A to 8C are graphs each depicting the characteristics of a cache hit rate for a request rate in the first embodiment.
Figure 8B:
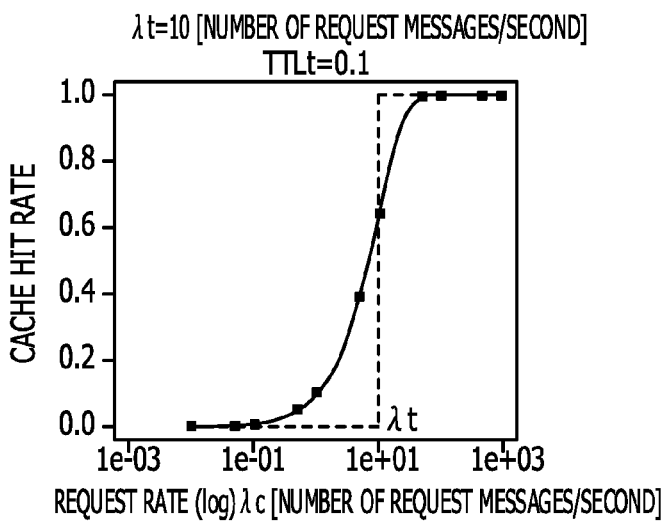
Figure 8C:
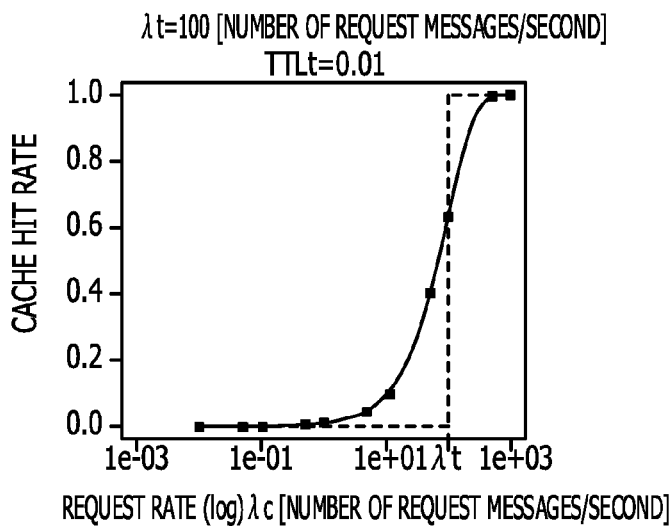

FIGS. 8A to 8C are graphs each depicting the characteristics of the cache hit rate for the request rate $\lambda c$ in the first embodiment. FIGS. 8A to 8C depict cases in which the reference values TTLt=1, 0.1, 0.01 (the threshold values $\lambda t=1, 10, 100$ (the number of request messages/second)), respectively. In FIGS. 8A to 8C, the horizontal axis represents the logarithmic value (log) of the request rate $\lambda c$ and the vertical axis represents the cache hit rate.

In FIGS. 8A to 8C, a rectangular point indicates the cache hit rate calculated by the numerical simulation. Moreover, when the calculated cache hit rate is used as a sample value, the solid line indicates the characteristics (the statistical estimate value) of the cache hit rate obtained based on the following approximate expression (1) and the dotted line indicates the ideal characteristics of the cache hit rate depicted in FIG. 2. Incidentally, in approximate expression (1), "e" represents the base of natural logarithm (Napier's constant).

$$\text{Cache hit rate} = 1 - e^{-\lambda c \cdot TTLt} \quad (1)$$

As depicted in FIGS. 8A to 8C, according to this embodiment, the characteristics close to the ideal characteristics (see FIG. 2) in which the cache hit rate for the request rate $\lambda c$ is divided into 1 and 0 across the threshold value $\lambda t$ are obtained. Therefore, according to this embodiment, it is possible to manage the cache data Cd with ease without measuring the request rate $\lambda c$.

However, like regions A1 and A2 depicted in FIG. 8A, there is the difference between the characteristics obtained by the numerical simulation and the ideal characteristics. In an embodiment which will be described below, the counter value Ni is controlled by a further improved method to reduce this difference.

Second Embodiment

Figure 9:
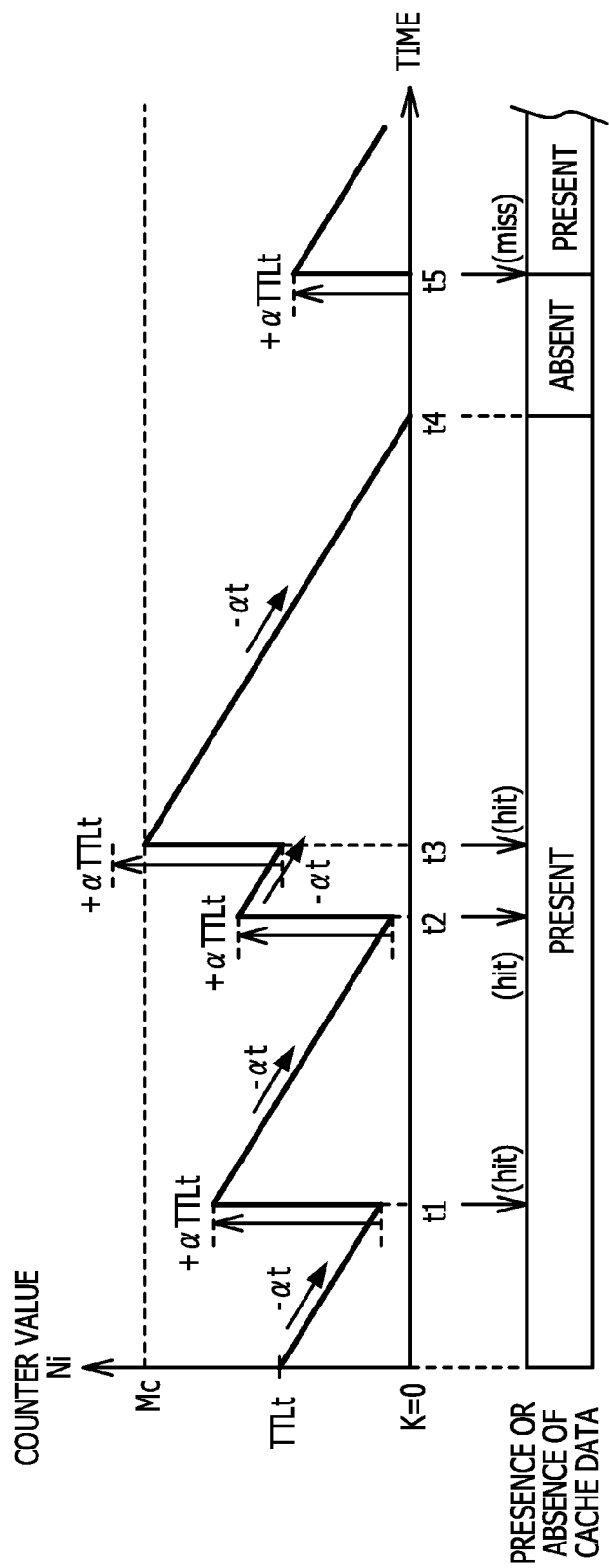
FIG. 9 is a graph depicting an example of changes in a counter value in a second embodiment.

FIG. 9 is a graph depicting an example of changes in the counter value Ni in a second embodiment. In FIG. 9, the horizontal axis represents the time and the vertical axis represents the counter value Ni. Here, times t1 to t3 and t5 indicate the time of receipt of the request message Rq, and time t4 indicates the time at which the counter value Ni has become the given value K=0. Moreover, in FIG. 9, as is the case with FIG. 5, the presence or absence of the cache data Cd in accordance with time and the presence or absence of a hit of the cache data Cd are depicted.

In this embodiment, the counter portion 102 sets the range of the counter value Ni at a range of the given value (the lower limit) K=0 to a given upper limit Mc. When the request message Rq is received, the counter portion 102 adds a value corresponding to the decrease rate $\alpha$ which is a decrement in a unit time t (for example, 1 (second)) of the counter value Ni and the reference value TTLt to the counter value Ni that decreases with time.

More specifically, the counter portion 102 subtracts $\alpha$ from the counter value Ni per unit time t, and, when the request message Rq is received, the counter portion 102 adds the product ($\alpha \cdot TTLt$) of the decrease rate $\alpha$ and the reference value TTLt to the counter value Ni.

As a result, the counter value Ni increases only by the addition value $\alpha \cdot TTLt$ at times t1 to t3 and t5 of receipt of the request message Rq and continues decreasing in the other periods of time. Therefore, in this embodiment, by adjusting the decrease rate $\alpha$, it is possible to set arbitrarily the speed at which the counter value Ni gets closer to the given value K=0 and the speed (the speed at which the counter value Ni gets closer to the upper limit Mc) at which the counter value Ni moves away from the given value 0.

Since the counter value Ni increases from the given value 0 only by the addition value $\alpha \cdot TTLt$ by the receipt of the request message Rq at times t1 to t3, the counter value Ni does not reach 0 (the given value K) until time t4. As a result, at times t1 to t3, the cache data Cd is stored in the cache memory 13, and a hit of the cache data Cd occurs. Incidentally, at time t3, the counter value Ni exceeds the upper limit Mc when the addition value $\alpha \cdot TTLt$ is added thereto, but the counter value Ni remains at the upper limit Mc due to a restriction imposed by the upper limit Mc.

The counter value Ni reaches 0 (the given value K) at time t4 and is maintained at 0 until time t5 at which a new request message Rq is received. When detecting that the counter value Ni has become 0, the cache managing portion 101 discards the cache data Cd. As a result, between time t4 and time t5, the cache data Cd is not stored in the cache memory 13.

Therefore, at time t5 of receipt of the request message Rq, a hit of the cache data Cd does not occur. At this time, the cache managing portion 101 transfers the request message Rq to the other content routers CR#1 to #6 (data distribution devices).

Moreover, the cache managing portion 101 acquires digital content from the server device 9 at time t5 of receipt of the request message Rq and caches the digital content in the cache memory 13. As a result, after time t5, the cache data Cd is stored in the cache memory 13.

As described above, if the request message Rq is not received, the counter value Ni gets closer to 0 (the given value K) with time and, when the request message Rq is received, the addition value $\alpha \cdot TTLt$ is added thereto. When the counter value Ni becomes 0, the cache data Cd is discarded. Therefore, the higher the request rate $\lambda c$ of digital content, that is, the higher the frequency of access to the digital content, the higher the probability (the probability of hits) of being cached.

Figure 10:
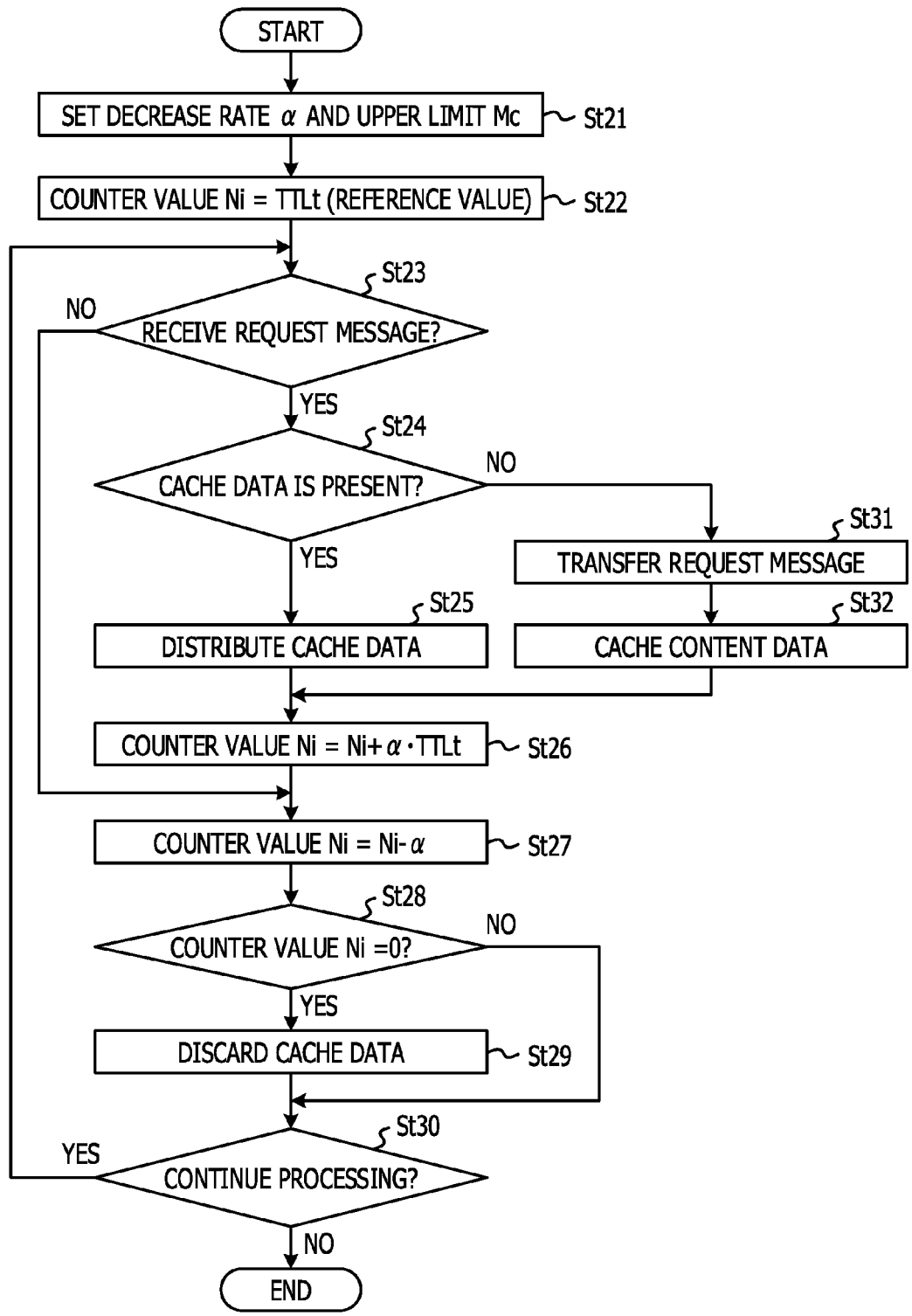
FIG. 10 is a flowchart depicting processing of the data distribution device according to the second embodiment.

FIG. 10 is a flowchart depicting processing (a data distribution method) of the data distribution device according to the second embodiment. FIG. 10 depicts processing related to management of the cache data Cd of one piece of digital content, and this processing is performed in a similar manner on cache data Cd of each digital content.

First, the counter portion 102 sets the decrease rate $\alpha$ and the upper limit Mc (step St21). The decrease rate $\alpha$ and the upper limit Mc are provided to the data distribution device (the content router) from a network management device, for example.

Next, the counter portion 102 sets the counter value Ni at the reference value TTLt (step St22). Then, the content distributing portion 100 determines whether or not the communication processing portion 14 has received the request message Rq (step St23).

If the request message Rq has been received (Yes in step St23), the content distributing portion 100 determines the presence or absence of cache data Cd of digital content corresponding to the request message Rq (step St24). Moreover, if the request message Rq has not been received (No in step St23), processing in step St27 which will be described later is performed.

If the cache data Cd is present (Yes in step St24), the content distributing portion 100 distributes the cache data Cd to the terminal devices 80 to 82 via the communication processing portion 14 (step St25). Moreover, if the cache data Cd is absent (No in step St24), the content distributing portion 100 transfers the request message Rq to the other content routers CR#1 to #6 via the communication processing portion 14 (step St31). Next, the content distributing portion 100 acquires digital content distributed from the server device 9 or the other content routers CR#1 to #6 and caches the digital content in the cache memory 13 (step St32). As a result, the cache data Cd is stored in the cache memory 13. Incidentally, processing in step St31 may be performed before or after processing in step St32 and vice versa.

After the processing in step St25 or steps St31 and St32, the counter portion 102 adds the addition value α·TTLt to the counter value Ni (step St26). Next, the counter portion 102 subtracts α from the counter value Ni (step St27). The processing in step St27 is performed at fixed time intervals based on a timing signal (a clock signal) which is input to the CPU 10, for example, such that a fixed decrement (decrease rate) is obtained in each unit time t of the counter value Ni.

Next, the cache managing portion 101 acquires the counter value Ni from the counter portion 102 and detects whether or not the counter value Ni is 0 (the given value K) (step St28). If the counter value Ni is not 0 (No in step St28), processing in step St30 which will be described later is performed.

If the counter value Ni is 0 (Yes in step St28), the cache managing portion 101 discards the cache data Cd (step St29). Then, if the CPU 10 continues the processing (Yes in step St30), the CPU 10 performs the processing in step St23 again; if the CPU 10 does not continue the processing (No in step St30) due to, for example, the shutdown of the data distribution device, the CPU 10 ends the processing. In this manner, the processing of the data distribution device is performed.

Next, the effect of the second embodiment will be described. Incidentally, the condition of numerical simulation for verifying the effect is the same as the condition depicted in FIG. 7.

Figure 11A:
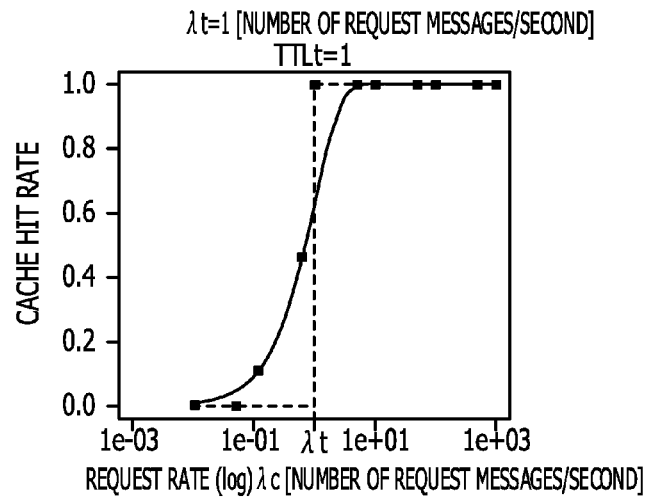
FIGS. 11A to 11C are graphs each depicting the characteristics of a cache hit rate for a request rate in the second embodiment.
Figure 11B:
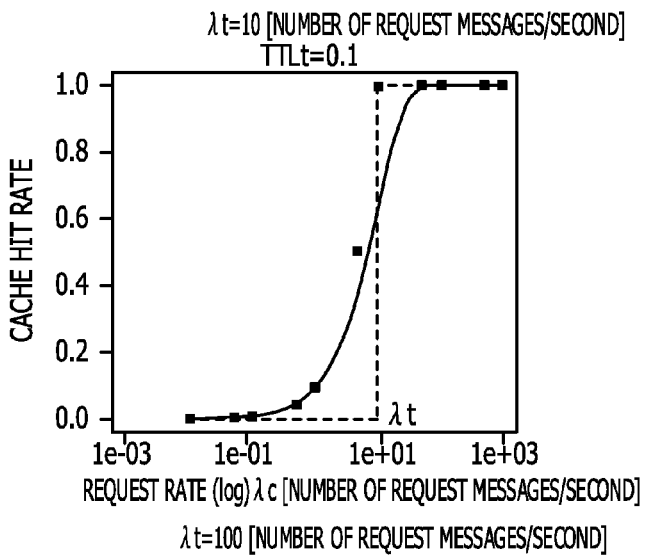
Figure 11C:
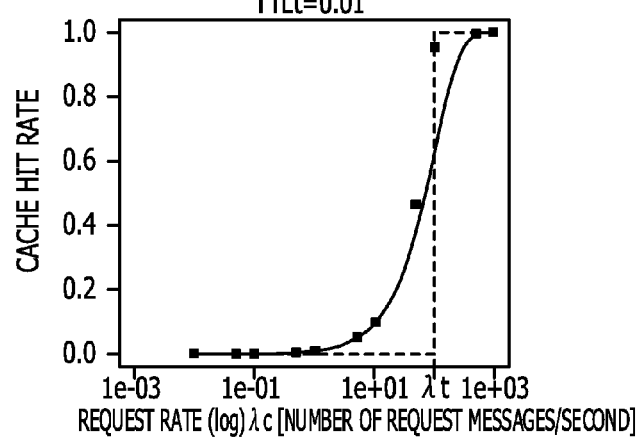

FIGS. 11A to 11C are graphs each depicting the characteristics of a cache hit rate for a request rate λc in the second embodiment. FIGS. 11A to 11C depict cases in which the reference values TTLt=1, 0.1, 0.01 (the threshold values λt=1, 10, 100 (the number of request messages/second)), respectively. In FIGS. 11A to 11C, the horizontal axis represents the logarithmic value (log) of the request rate λc and the vertical axis represents the cache hit rate.

In FIGS. 11A to 11C, a rectangular point indicates the cache hit rate calculated by the numerical simulation. Moreover, when the calculated cache hit rate is used as a sample value, the solid line indicates the characteristics (the statistical estimate value) of the cache hit rate obtained based on the above-described approximate expression (1) for changes in a counter value in the first embodiment, and the dotted line indicates the ideal characteristics of the cache hit rate depicted in FIG. 2.

As depicted in FIGS. 11A to 11C, according to this embodiment, the characteristics close to the ideal characteristics (see FIG. 2) in which the cache hit rate for the request rate λc is divided into 1 and 0 across the threshold value λt are obtained. Moreover, in this embodiment, as is clear from a comparison with the characteristics in the first embodiment (FIGS. 8A to 8C), the characteristics in which the cache hit rate obtained when the request rate λc is the threshold value λt becomes a value close to 1.0 are obtained.

Therefore, according to this embodiment, for example, a difference region A1 depicted in FIG. 8A, for example, is reduced. As a result, when the request rate λc exceeds the threshold value λt, the probability that the cache data Cd is held is increased as compared to the first embodiment.

However, the characteristics obtained when the request rate λc falls below the threshold value λt have a difference equal to the difference region A2 depicted in FIG. 8A. As a result, there is not a little probability that even digital content whose request rate λc is lower than the threshold value λt is cached. This is caused by the fact that, since the lower limit of the counter value Ni is limited by the given value K=0, even digital content with a low request rate λc certainly has a period in which the counter becomes 0 or more.

Thus, in the following third embodiment, the range of the counter value Ni is expanded such that the counter value Ni is allowed to take a value lower than the given value K.

Third Embodiment

Figure 12:
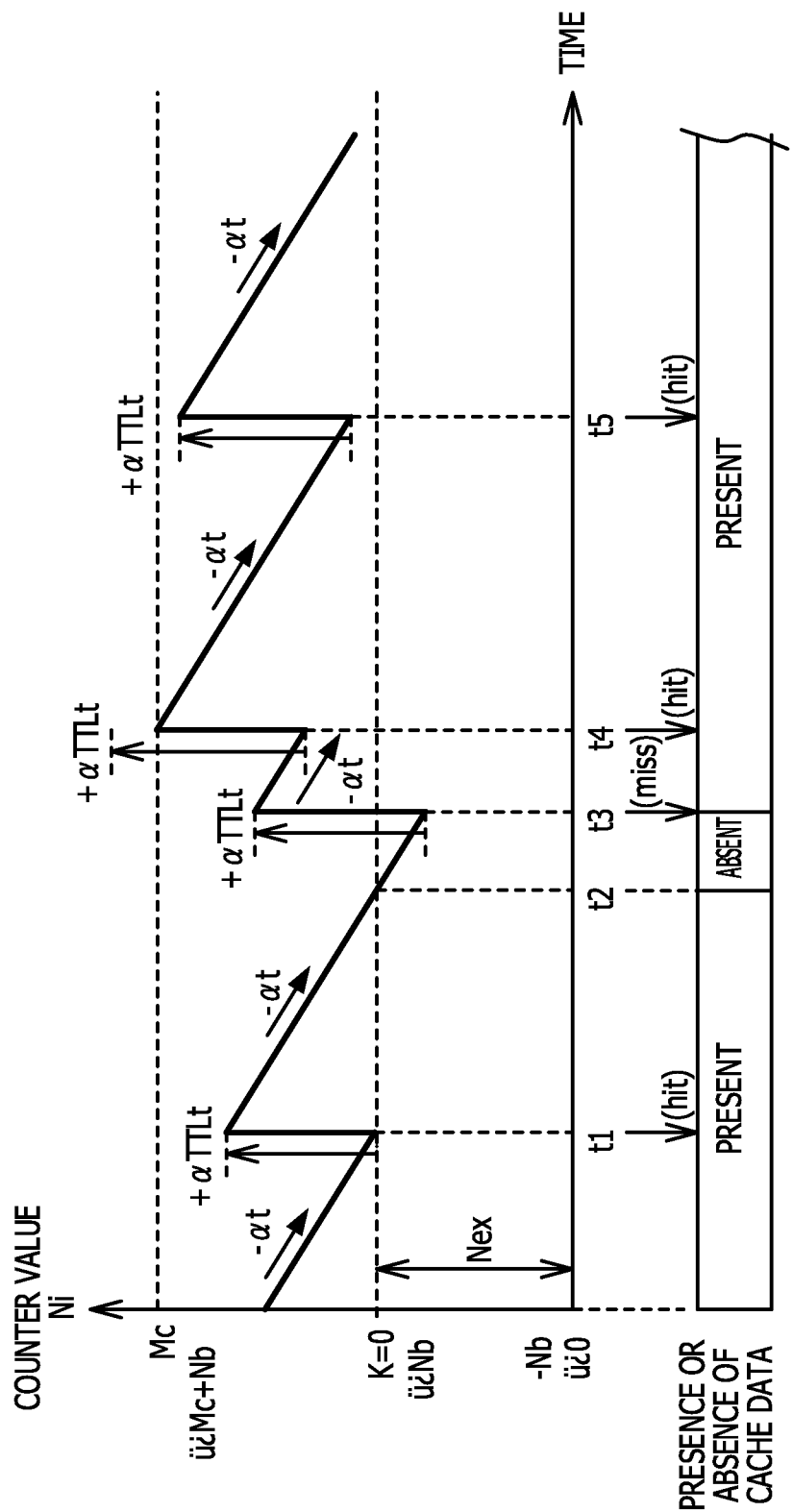
FIG. 12 is a graph depicting an example of changes in a counter value in a third embodiment.

FIG. 12 is a graph depicting an example of changes in the counter value Ni in the third embodiment. In FIG. 12, the horizontal axis represents the time and the vertical axis represents the counter value Ni. Here, times t1 and t3 to t5 indicate the time of receipt of the request message Rq, and time t2 indicates the time at which the counter value Ni has become the given value K. Moreover, in FIG. 12, as is the case with FIG. 5, the presence or absence of the cache data Cd in accordance with time and the presence or absence of a hit of the cache data Cd are depicted.

In this embodiment, the counter portion 102 sets the range of the counter value Ni at a range of a given lower limit −Nb (Nb is a positive integer) which is smaller than the given value K to a given upper limit Mc. As a result, the range of the counter value Ni is expanded to a negative value region Nex. Since it is, indeed, easier to process the counter value Ni as 0 or a positive integer, in the example of FIG. 12, the range of the counter value Ni is offset only by Nb in a positive direction and processing is then performed. It is for this reason that, in the following description, the lower limit is set at 0, the given value K is set at Nb, and the upper limit is set at Mc+Nb.

When the request message Rq is received, the counter portion 102 adds a value corresponding to the decrease rate α and the reference value TTLt to the counter value Ni that decreases with time. More specifically, as is the case with the second embodiment, the counter portion 102 subtracts α from the counter value Ni per unit time t and, when the request message Rq is received, adds the addition value α·TTLt to the counter value Ni.

As a result, the counter value Ni increases only by the addition value α·TTLt at times t1 and t3 to t5 of receipt of the request message Rq and continues decreasing in the other periods of time. The counter value Ni reaches the given value K=Nb at time t2 and is the given value K or less (that is, the expanded range) between time t2 and time t3.

When detecting that the counter value Ni has become 0, the cache managing portion 101 discards the cache data Cd. As a result, between time t2 and time t3, the cache data Cd is not stored in the cache memory 13.

Therefore, at time t3 of receipt of the request message Rq, a hit of the cache data Cd does not occur. At this time, the cache managing portion 101 transfers the request message Rq to the other content routers CR#1 to #6 (data distribution devices).

Moreover, at time t3 of receipt of the request message Rq, the cache managing portion 101 acquires digital content from the server device 9 and caches the digital content in the cache memory 13. As a result, after time t3, the cache data Cd is stored in the cache memory 13, and, at the other times t1, t4, and t5 of receipt, a hit of the cache data Cd occurs.

As described above, the counter value Ni gets closer to 0 (the given value K) with time if the request message Rq is not received and falls below 0 if the request message Rq is not received before the counter value Ni becomes 0. Moreover, when the request message Rq is received, the addition value α·TTLt is added to the counter value Ni. When the counter value Ni becomes 0, the cache data Cd is discarded. Therefore, the higher the request rate λc of digital content, that is, the higher the frequency of access to the digital content, the higher the probability (the probability of hits) of being cached.

Figure 13:
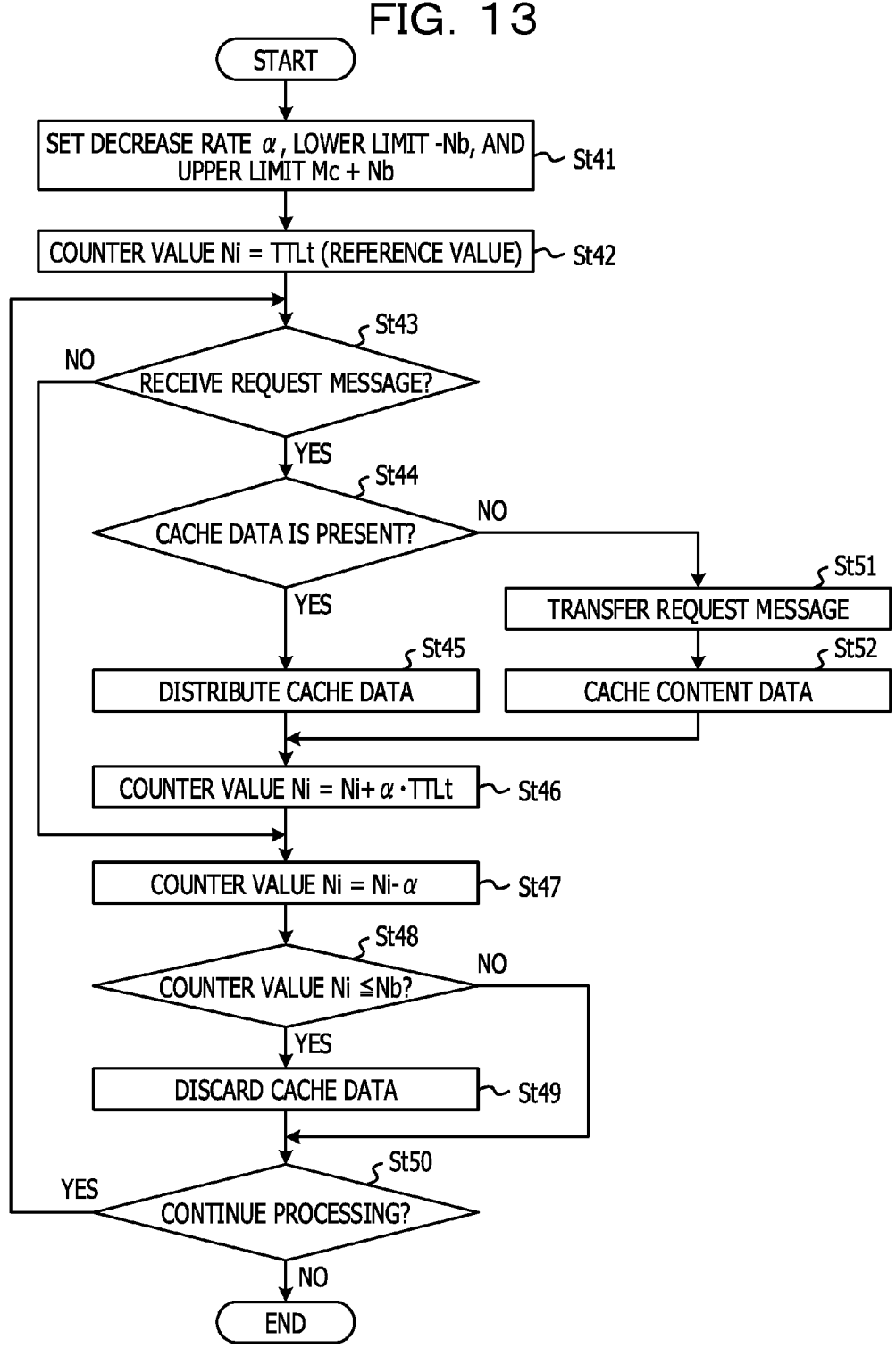
FIG. 13 is a flowchart depicting processing of the data distribution device according to the third embodiment.

FIG. 13 is a flowchart depicting processing (a data distribution method) of the data distribution device according to the third embodiment. FIG. 13 depicts processing related to management of the cache data Cd of one piece of digital content, and this processing is performed in a similar manner on cache data Cd of each digital content.

First, the counter portion 102 sets the decrease rate α, the lower limit −Nb, and the upper limit Mc+Nb (step St41). The decrease rate α, the lower limit −Nb, and the upper limit Mc+Nb are provided to the data distribution device (the content router) from the network management device, for example.

Next, the counter portion 102 sets the counter value Ni at the reference value TTLt (step St42). Then, the content distributing portion 100 determines whether or not the communication processing portion 14 has received the request message Rq (step St43).

If the request message Rq has been received (Yes in step St43), the content distributing portion 100 determines the presence or absence of cache data Cd of digital content corresponding to the request message Rq (step St44). Moreover, if the request message Rq has not been received (No in step St43), processing in step St47 which will be described later is performed.

If the cache data Cd is present (Yes in step St44), the content distributing portion 100 distributes the cache data Cd to the terminal devices 80 to 82 via the communication processing portion 14 (step St45). Moreover, if the cache data Cd is absent (No in step St44), the content distributing portion 100 transfers the request message Rq to the other content routers CR#1 to #6 via the communication processing portion 14 (step St51). Next, the content distributing portion 100 acquires the digital content distributed from the server device 9 or the content routers CR#1 to #6 and caches the digital content in the cache memory 13 (step St52). As a result, the cache data Cd is stored in the cache memory 13. Incidentally, processing in step St51 may be performed before or after processing in step St52 and vice versa.

After the processing in step St45 or steps St51 and St52, the counter portion 102 adds the addition value α·TTLt to the counter value Ni (step St46). Next, the counter portion 102 subtracts α from the counter value Ni (step St47). The processing in step St47 is performed at fixed time intervals based on a timing signal (a clock signal) which is input to the CPU 10, for example, such that a fixed decrement (decrease rate) is obtained in each unit time t of the counter value Ni.

Next, the cache managing portion 101 acquires the counter value Ni from the counter portion 102 and detects whether or not the counter value Ni is smaller than or equal to Nb (the given value K) (step St48). If the counter value Ni is greater than Nb (No in step St48), processing in step St50 which will be described later is performed.

If the counter value Ni is smaller than or equal to Nb (Yes in step St48), the cache managing portion 101 discards the cache data Cd (step St49). Then, if the CPU 10 continues the processing (Yes in step St50), the CPU 10 performs the processing in step St43 again; if the CPU 10 does not continue the processing (No in step St50) due to, for example, the shutdown of the data distribution device, the CPU 10 ends the processing. In this manner, the processing of the data distribution device is performed.

Next, the effect of the third embodiment will be described. Incidentally, the condition of numerical simulation for verifying the effect is the same as the condition depicted in FIG. 7.

Figure 14A:
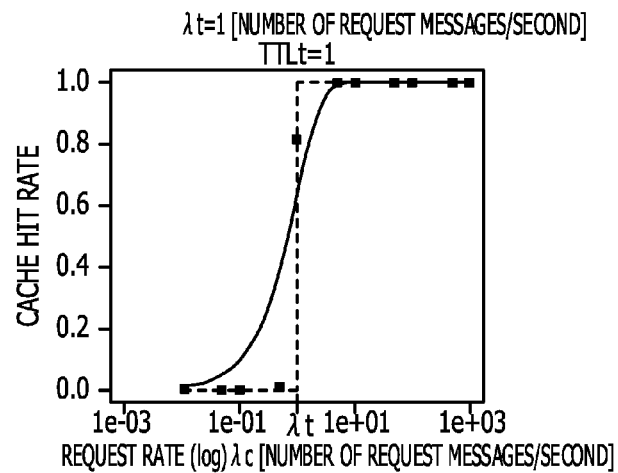
FIGS. 14A to 14C are graphs each depicting the characteristics of a cache hit rate for a request rate in the third embodiment.
Figure 14B:
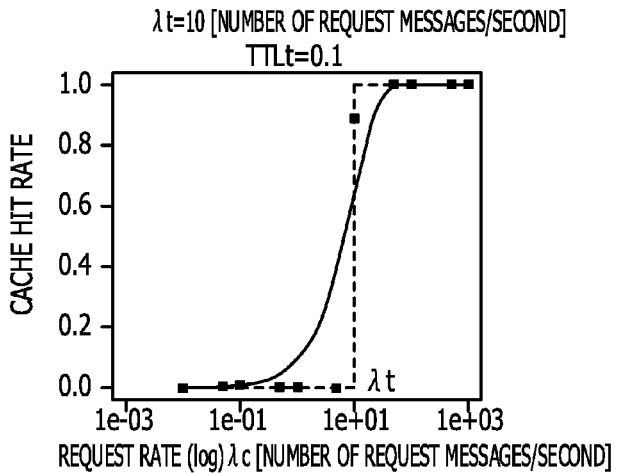
Figure 14C:
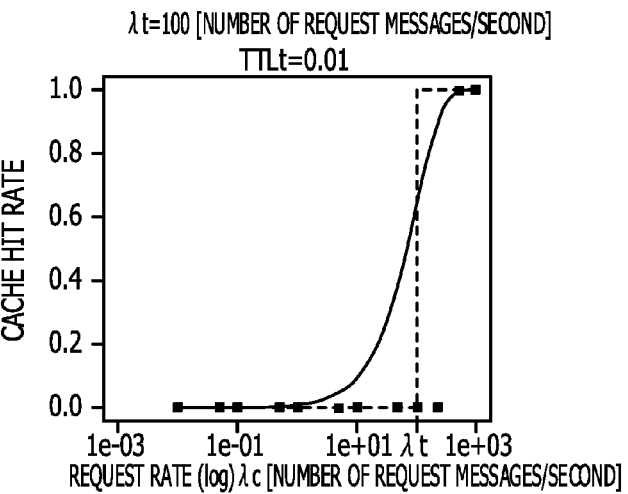

FIGS. 14A to 14C are graphs each depicting the characteristics of a cache hit rate for a request rate λc in the third embodiment. FIGS. 14A to 14C depict cases in which the reference values TTLt=1, 0.1, 0.01 (the threshold values λt=1, 10, 100 (the number of request messages/second)), respectively. In FIGS. 14A to 14C, the horizontal axis represents the logarithmic value (log) of the request rate λc and the vertical axis represents the cache hit rate.

In FIGS. 14A to 14C, a rectangular point indicates the cache hit rate calculated by the numerical simulation. Moreover, when the calculated cache hit rate is used as a sample value, the solid line indicates the characteristics (the statistical estimate value) of the cache hit rate obtained based on the above-described approximate expression (1) for changes in a counter value in the first embodiment, and the dotted line indicates the ideal characteristics of the cache hit rate depicted in FIG. 2.

As depicted in FIGS. 14A to 14C, according to this embodiment, the characteristics close to the ideal characteristics (see FIG. 2) in which the cache hit rate for the request rate λc is divided into 1 and 0 across the threshold value λt are obtained. Moreover, in this embodiment, as is clear from a comparison with the characteristics in the first and second embodiments (FIGS. 8A to 8C and 11A to 11C), the characteristics in which the cache hit rate for the request rate λc which is lower than the threshold value λt becomes a value close to 0 are obtained. This is caused by the fact that the counter value Ni of digital content whose request rate λc is lower than the threshold value λt is smaller than the given value Nb at all times and such digital content is discarded immediately.

Therefore, according to this embodiment, for example, the difference region A2 depicted in FIG. 8A is reduced. As a result, when the request rate λc falls below the threshold value λt, the probability that the cache data Cd is held becomes lower than the probabilities in the first and second embodiments.

In the embodiments described above, the counter portion 102 brings the counter value Ni closer to the given value by decreasing the counter value Ni and makes the counter value Ni move away from the given value K by increasing the counter value Ni. However, the counter portion 102 may bring the counter value Ni closer to the given value by increasing the counter value Ni and make the counter value Ni move away from the given value K by decreasing the counter value Ni. If the first embodiment is taken up as an example, the counter portion 102 brings the counter value Ni closer to the given value K=TTLt by increasing the counter value Ni with time and brings the counter value Ni back to 0 when the request message Rq is received. Moreover, in the second and third embodiments, the counter portion 102 makes the counter value Ni get closer to the given value K=TTLt by increasing the counter value Ni with time and subtracts a subtraction value α·TTLt from the counter value when the request message Rq is received. As a result, the same effect as the above-described effect is obtained.

As described above, the data distribution device (the content routers CR#1 to #6) according to the embodiments includes the storing portion (the cache memory) 13, the distributing portion (the content distributing portion) 100, the counter portion 102, and the managing portion (the cache managing portion) 101. The storing portion 13 stores cache data Cd of data to be distributed. The distributing portion 100 reads the cache data Cd from the storing portion 13 in accordance with the request message Rq received from the other devices (the terminal devices) 80 to 82 and distributes the cache data Cd to the other devices 80 to 82.

The counter portion 102 sets, as a reference value, the reciprocal TTLt of the threshold value λt of the reception rate (the request rate) λc of the request message Rq, the reception rate (the request rate) λc based on which whether or not to cache data is determined. The counter portion 102 updates the counter value Ni that gets closer to the given value K with time in such a way as to make the counter value Ni move away from the given value K in accordance with the reference value TTLt when the request message Rq is received. The managing portion 101 discards the cache data Cd when the counter value Ni becomes the given value K.

In the data distribution device according to the embodiments, since the distributing portion 100 distributes the cache data Cd to the other devices 80 to 82 in accordance with the request message Rq, the other devices 80 to 82 are capable of receiving data without accessing the server device 9 which is a supply source of data to be distributed.

Moreover, the counter value Ni gets closer to the given value K with time and moves away from the given value K in accordance with the reference value TTLt by the receipt of the request message Rq, and, when the counter value Ni becomes the given value K, the cache data Cd is discarded. Here, the reference value TTLt is the reciprocal of the threshold value λt of the reception rate of the request message Rq, the reception rate based on which whether or not to cache data is determined.

Therefore, as depicted in FIGS. 8A to 8C, the characteristics close to the ideal characteristics in which the cache hit rate for the reception rate (the request rate λc) of the request message Rq is divided into 1 and 0 across the threshold value are obtained without the measurement of the reception rate. Thus, the data distribution device according to the embodiments makes it possible to manage the cache data Cd with ease.

Moreover, the data distribution method according to the embodiments includes the following processes. Process (1): Cache data Cd of data to be distributed is stored in the storing portion 13. Process (2): The cache data Cd is read from the storing portion 13 in accordance with the request message Rq received from the other devices 80 to 82 and is distributed to the other devices 80 to 82. Process (3): The reciprocal of the threshold value λt of the request rate of the request message Rq, the reception rate based on which whether or not to cache data is determined, is set as the reference value TTLt, and the counter value Ni that gets closer to the given value K with time is updated in such a way that the counter value Ni moves away from the given value K in accordance with the reference value TTLt when the request message Rq is received. Process (4): The cache data Cd is discarded when the counter value Ni becomes the given value K.

Since the data distribution method according to the embodiments has the same configuration as the data distribution device described above, the same effect as the above-described effect is obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data distribution device comprising:
   a memory; and
   a processor coupled to the memory and the processor configured to:
   receive data transmitted from a server device when a request message for requesting the data from the server device is received from a first device and the data is not stored in the memory;
   store the received data in the memory and transmit the received data to the first device;
   set a counter value associated with the stored data in response to store the received data, the counter value indicating remaining time before discarding the stored data and getting closer to a given value with time, the counter value being set at a range of the given value to a given upper limit value;
   distribute the stored data to a second device when a request message for requesting the data from the server device is received from the second device and the data is stored in the memory;
   update, when distributing the stored data, the counter value so that the remaining time is increased, the updating including adding a value to the counter value, the updating including setting the counter value to the given upper limit value when sum of the value to be added and the counter value before the updating exceeds the given upper limit value; and
   discard the stored data in the memory when the counter value becomes the given value.

2. The data distribution device according to claim 1, wherein
   the processor is configured to:
   set the range of the counter value at a range of the given value to the reference value and,
   when the request message is received, bring the counter value that decreases with time back to the reference value.

3. The data distribution device according to claim 1, wherein
   the value to be added is determined based on a reciprocal of a threshold value of a reception rate of the request message.

4. The data distribution device according to claim 1, wherein
   the processor is configured to:
   set the range of the counter value at a range of a given lower limit less than the given value to a given upper limit,
   when the request message from the second device is received, add a value corresponding to a decrement in a unit time of the counter value and the reference value to the counter value, and
   discard the stored data in the memory when the counter value becomes the given value or less, wherein
   the counter value keeps operating after the stored data has been discarded.

5. The data distribution device according to claim 4, wherein
   the processor is configured to:
   when the request message from the second device is received after the stored data has been discarded, acquire the data from a server device and distribute the data to the second device; and store the acquired data in the memory and associate the counter value to be kept operating with the acquired data.

6. A data distribution method comprising:

receiving data transmitted from a server device when a request message for requesting the data from the server device is received from a first device and the data is not stored in the memory;

storing the received data in the memory and transmitting the received data to the first device;

setting a counter value associated with the stored data in response to the storing the received data, the counter value indicating remaining time before discarding the stored data and getting closer to a given value with time, the counter value being set at a range of the given value to a given upper limit value;

distributing the stored data to a second device when a request message for requesting the data from the server device is received from the second device and the data is stored in the memory;

updating, when distributing the stored data, the counter value so that the remaining time is increased, the updating including adding a value to the counter value, the updating including setting the counter value to the given upper limit value when sum of the value to be added and the counter value before the updating exceeds the given upper limit value; and discarding the stored data in the memory when the counter value becomes the given value.

7. The data distribution method according to claim 6, further comprising:

setting the range of the counter value at a range of the given value to the reference value and, when the request message is received, bringing the counter value that decreases with time back to the reference value.

8. The data distribution method according to claim 6, further comprising:

determining the value to be added based on a reciprocal of a threshold value of a reception rate of the request message.

9. The data distribution method according to claim 6, further comprising:

setting the range of the counter value at a range of a given lower limit less than the given value to a given upper limit, when the request message from the second device is received, adding a value corresponding to a decrement in a unit time of the counter value and the reference value to the counter value; and discarding the stored data in the memory when the counter value becomes the given value or less, wherein the counter value keeps operating after the stored data has been discarded.

10. The data distribution method according to claim 9, further comprising:

when the request message from the second device is received after the stored data has been discarded, acquiring the data from a server device and distributing the data to the second device; and storing the acquired data in the memory and associating the counter value to be kept operating with the acquired data.

* * * * *